(12) United States Patent
Horn

(10) Patent No.: US 6,487,962 B1
(45) Date of Patent: Dec. 3, 2002

(54) APPARATUS FOR CONTROLLED HYDRATION GRAIN COOKING

(76) Inventor: Darrell C. Horn, P.O. Box 3109, Rohnert Park, CA (US) 94927

( * ) Notice: Subject to any disclaimer, the term of this patent is extended or adjusted under 35 U.S.C. 154(b) by 0 days.

(21) Appl. No.: 09/937,334

(22) PCT Filed: Mar. 29, 2000

(86) PCT No.: PCT/US00/08801
§ 371 (c)(1),
(2), (4) Date: Sep. 21, 2001

(87) PCT Pub. No.: WO00/57722
PCT Pub. Date: Oct. 5, 2000

Related U.S. Application Data
(60) Provisional application No. 60/126,934, filed on Mar. 29, 1999, and provisional application No. 60/157,170, filed on Sep. 30, 1999.

(51) Int. Cl.[7] .............. A23L 1/00; A23L 1/10; A47J 37/12; A23N 17/00; A23B 9/00
(52) U.S. Cl. .............. 99/330; 99/348; 99/355; 99/443 C; 99/487; 99/516; 99/483
(58) Field of Search .......... 99/325–333, 339, 99/340, 348, 352–355, 386, 443 R, 443 C, 477–479, 485–487, 516, 534–536; 134/132; 366/79, 318; 426/231, 233, 507, 510, 511, 523

(56) References Cited

U.S. PATENT DOCUMENTS

| | | | | |
|---|---|---|---|---|
| 4,561,347 A | * | 12/1985 | Zaitu | 99/352 |
| 4,571,341 A | * | 2/1986 | Sugimura | 426/510 |
| 4,873,917 A | * | 10/1989 | Sugimara et al. | 99/355 |
| 5,152,966 A | * | 10/1992 | Roe et al. | 99/475 X |
| 6,129,010 A | * | 10/2000 | Hurd et al. | 99/353 |
| 6,386,748 B1 | * | 5/2002 | Huber et al. | 366/79 |

* cited by examiner

Primary Examiner—Timothy F. Simone
(74) Attorney, Agent, or Firm—Larry D. Johnson; Craig M. Stainbrook; Johnson & Stainbrook, LLP

(57) ABSTRACT

An apparatus for controlled hydration and continuous full absorption cooking of a bed of particulate food product, the apparatus comprising a substantially horizontal vessel (12) in which the hydration and cooking process takes place, having an inlet end (14) and an inlet port (16) for introducing food product into the vessel, an outlet end (18) and an outlet port (20) for the discharge of the food product, an upper portion (22), and at least one trough portion (24); a loading device (38) for introducing food product into the vessel; a conveying device (30) for moving food product from the inlet end to the outlet end of the vessel during the hydration and cooking process; a hydration device (47) for hydration and cooking the food product during the transit by the conveying device from the inlet end to the outlet end of the vessel, the hydration device delivering water to the surfaces of the food product so that the food product is exposed to water at substantially its rate of absorption during the hydration and cooking process; and an outlet device for discharging the food product from the vessel.

27 Claims, 7 Drawing Sheets

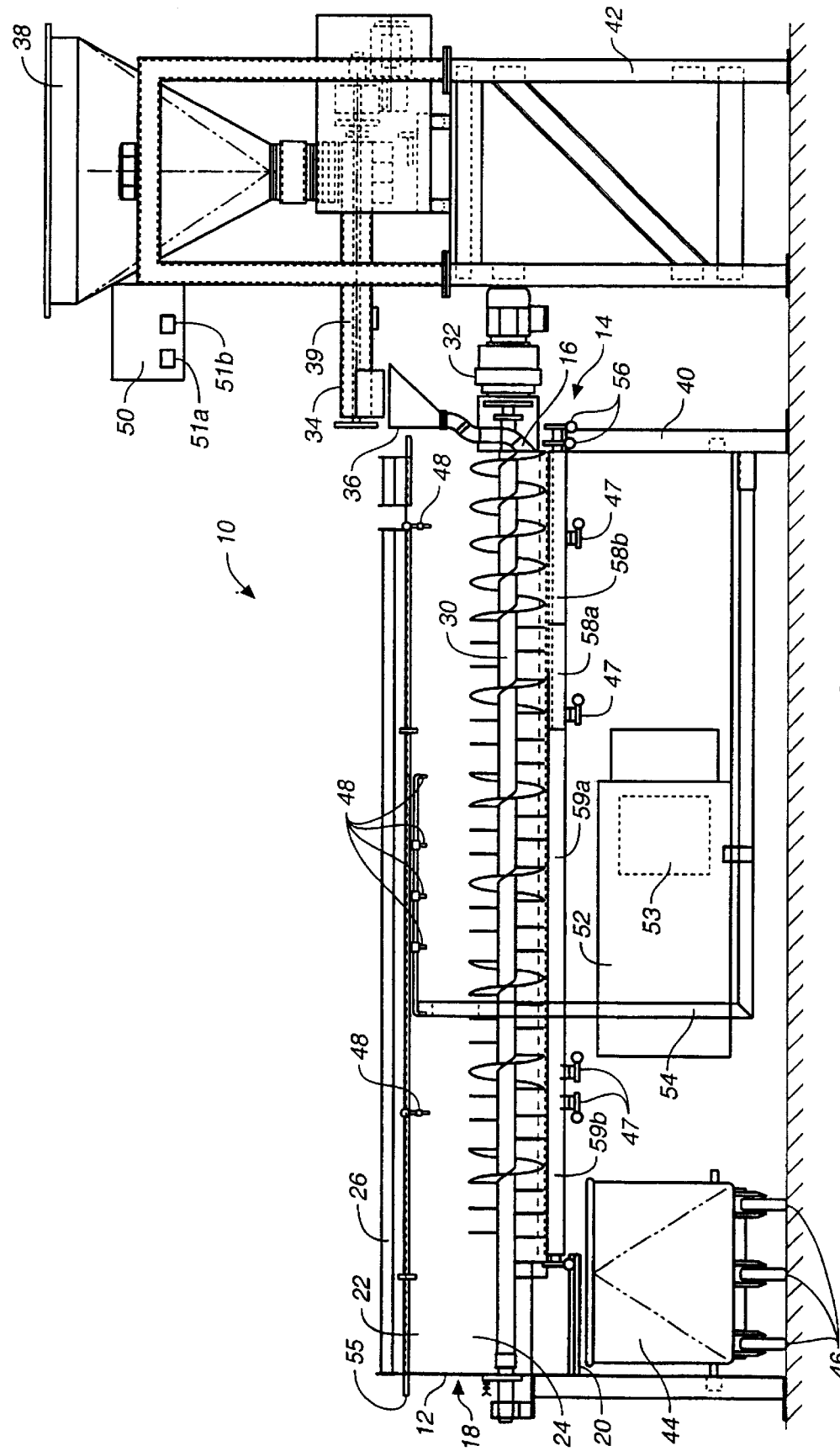
FIG._1

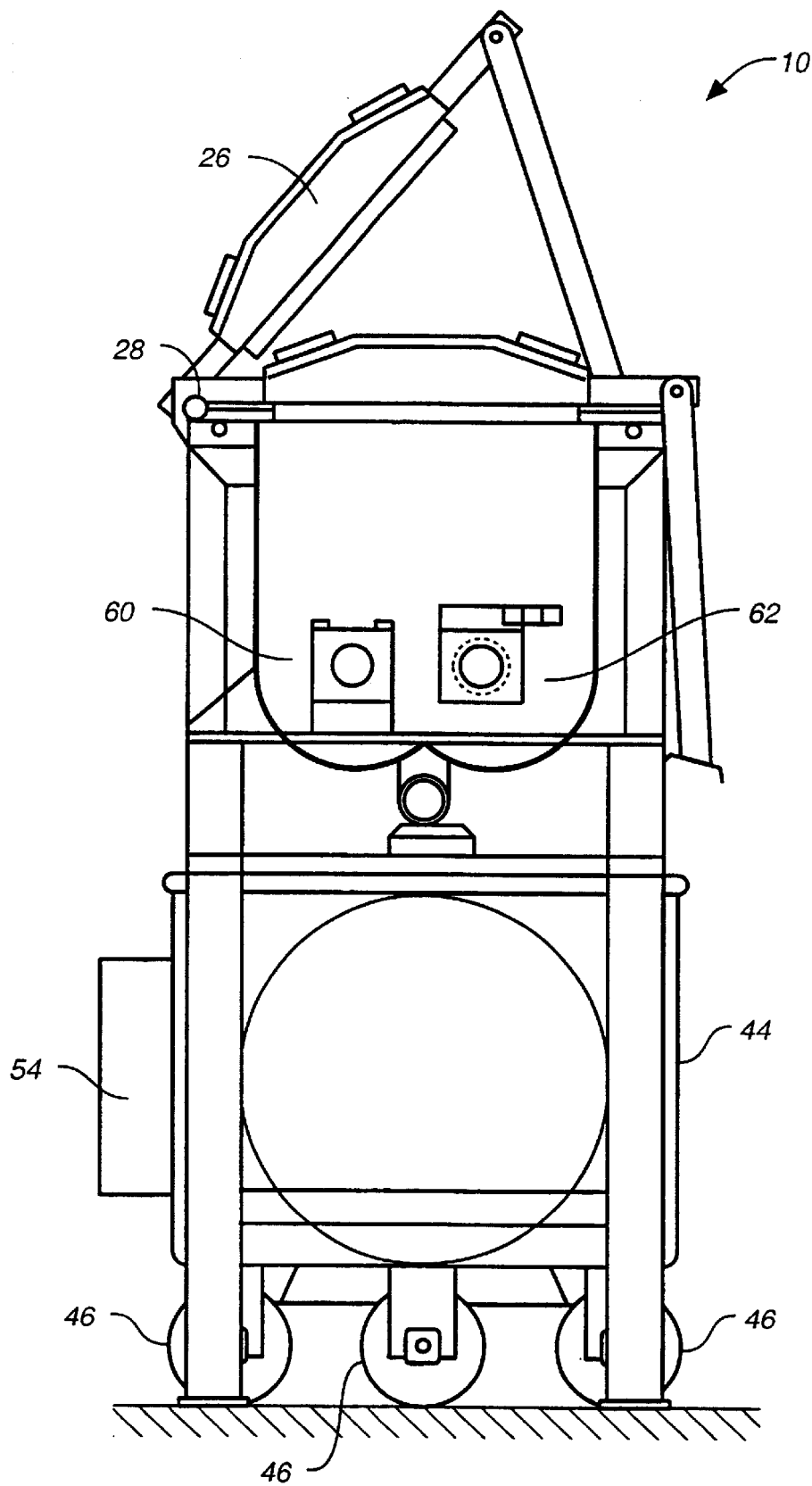
FIG._2

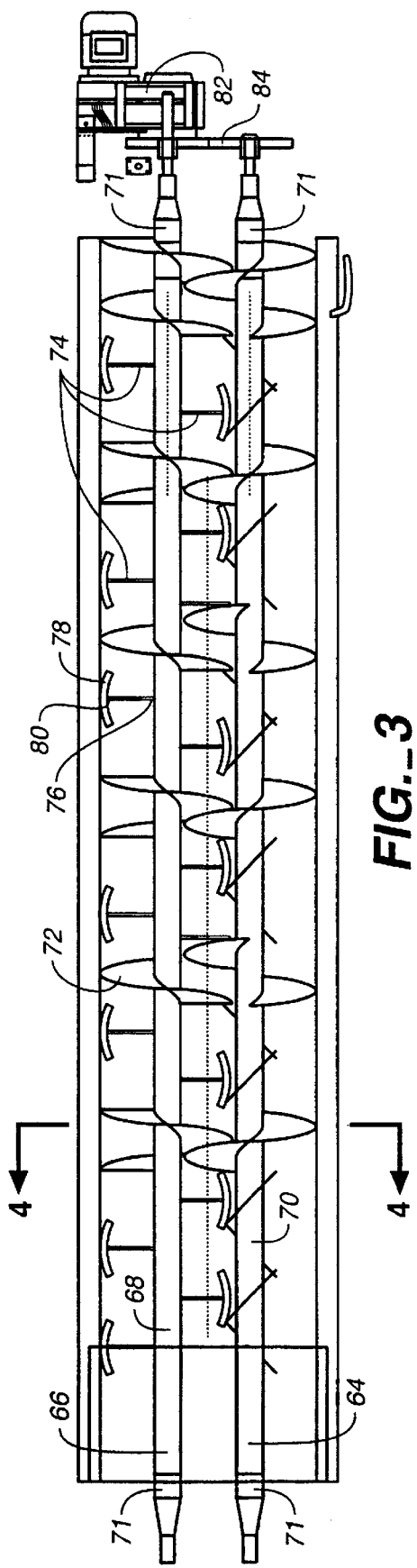
FIG._3
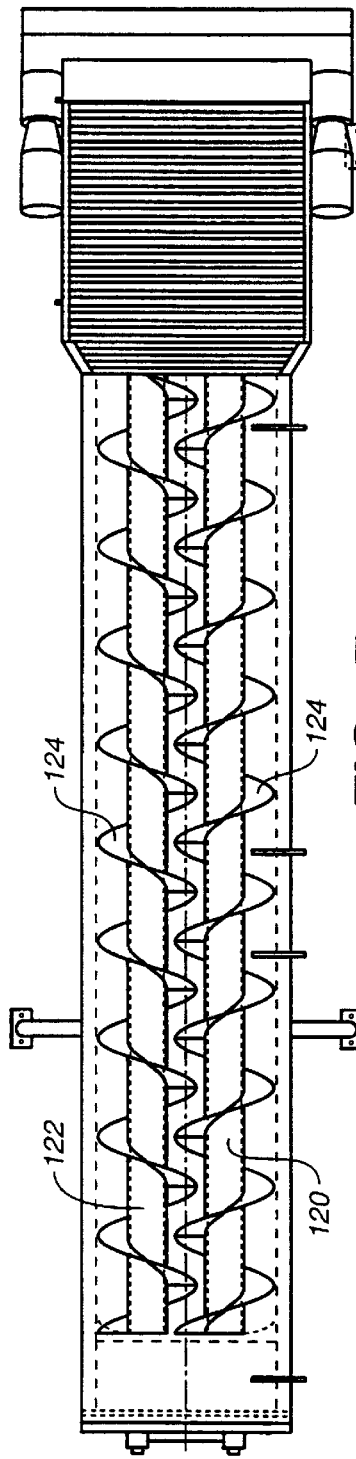
FIG._7

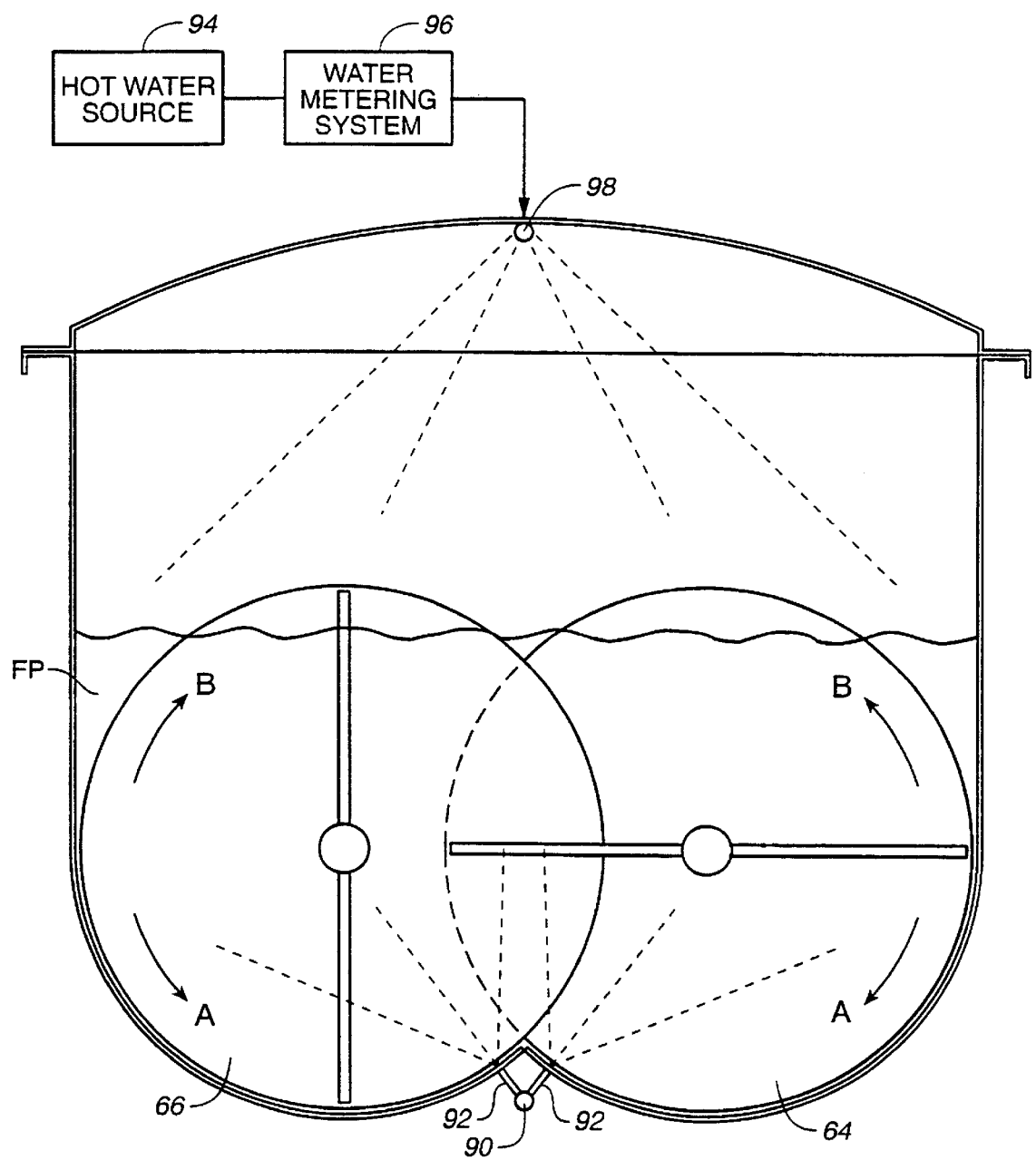
FIG._4

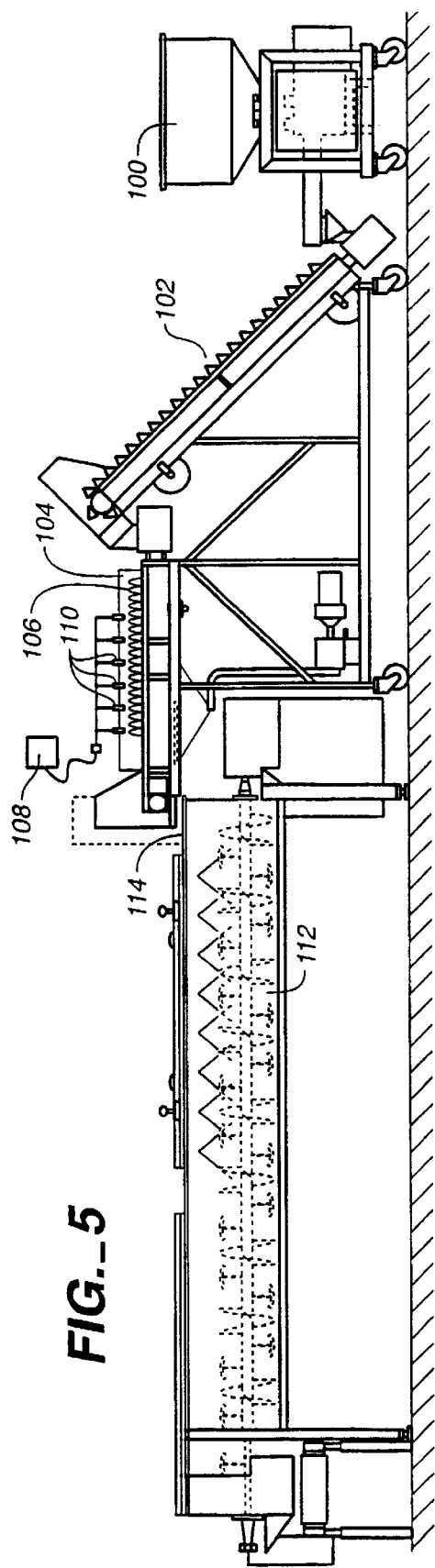
FIG._5
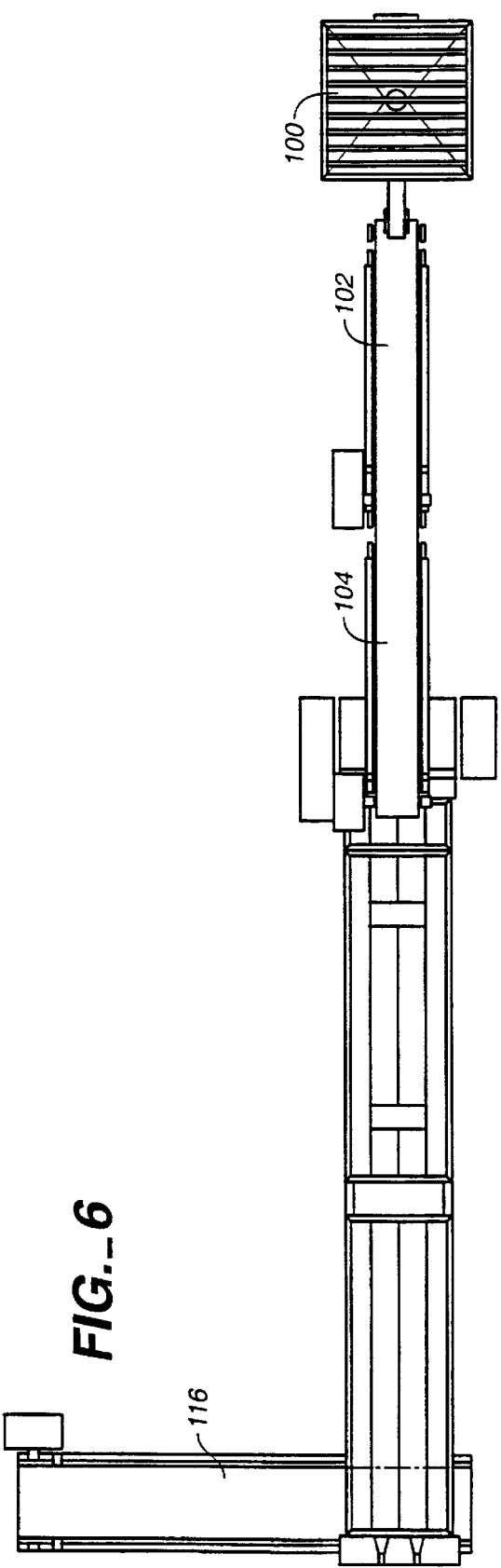
FIG._6

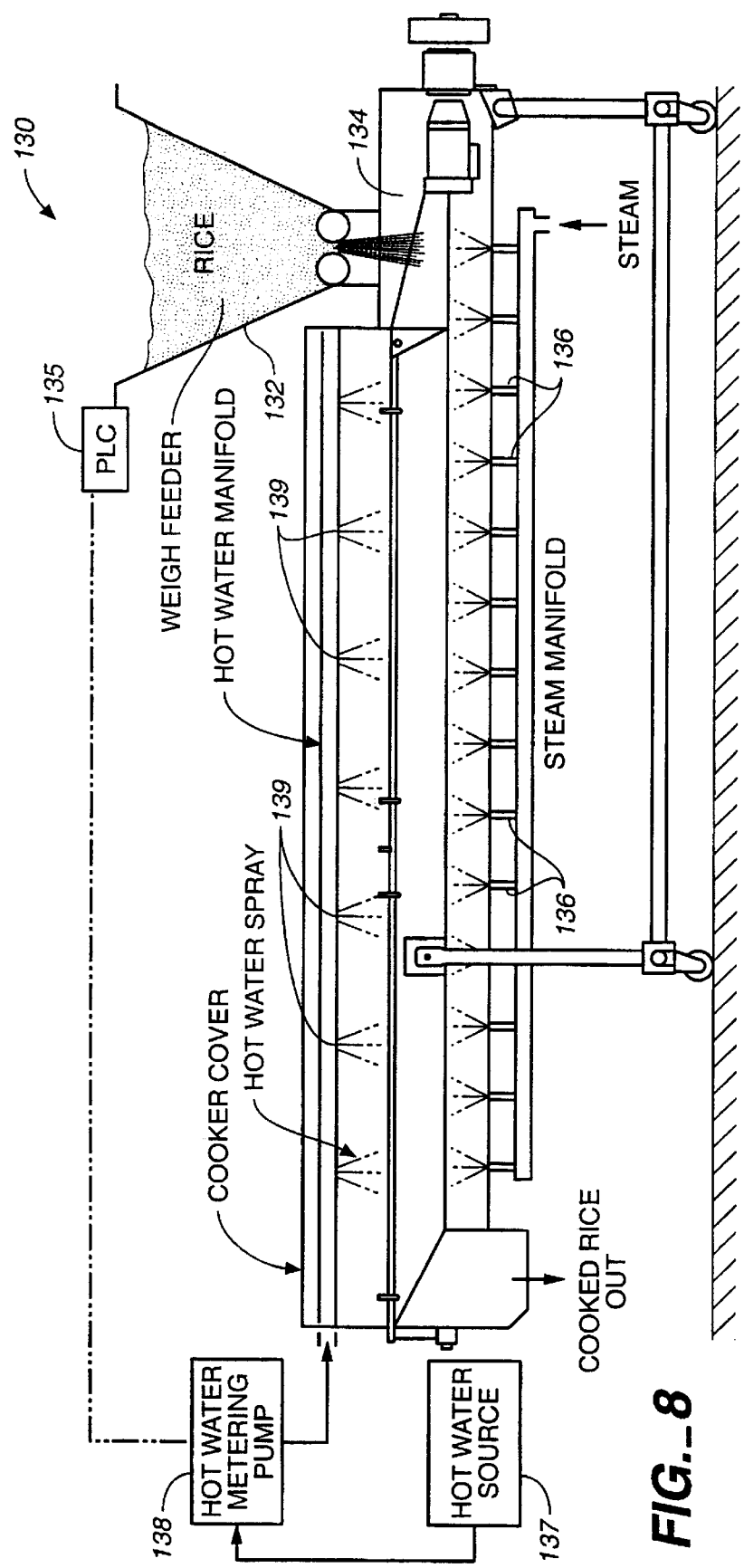

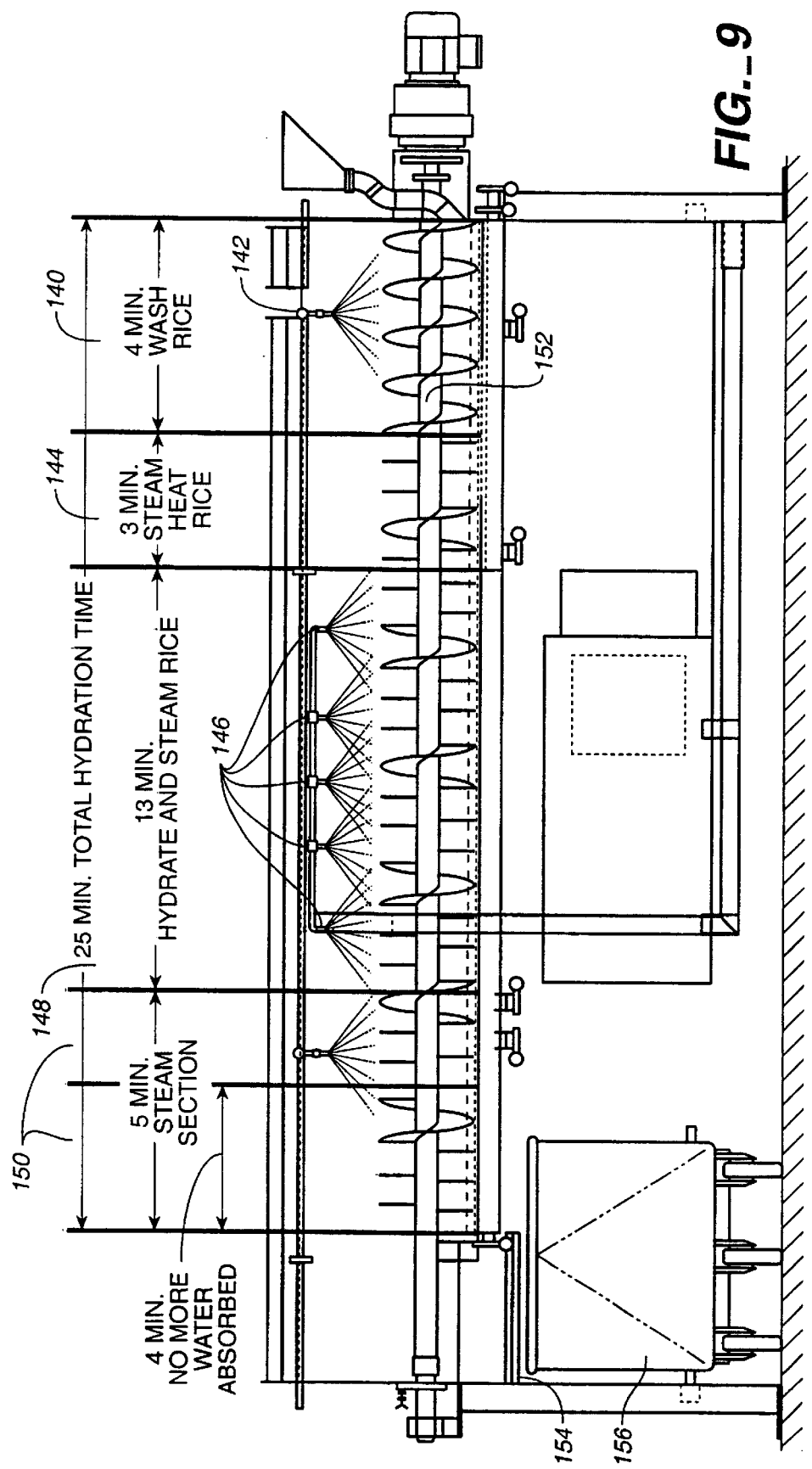

APPARATUS FOR CONTROLLED HYDRATION GRAIN COOKING

CROSS REFERENCE TO RELATED APPLICATIONS

The present application claims the benefit of the filing dates of U.S. Provisional Applications, Ser. No. 60/126,934, filed Mar. 29, 1999, and Ser. No. 60/157,170, filed Sep. 30, 1999.

TECHNICAL FIELD

The present invention relates generally to large scale grain cookers, and more particularly to a method and apparatus for continuous controlled hydration grain cooking.

BACKGROUND ART

Rice is normally cooked in batches using what is known as a "full absorption method." This entails placing a measured volume of rice in a vessel, submerging it in precisely the amount of water that the rice will absorb, and heating the water to a full boil. A measured amount of rice that matches the water in the vessel is then added to the water and the combination of water and rice is brought to a boil while simultaneously being mixed gently. Once the water is boiling the heat is turned down or off and the rice is allowed to sit in the water at a temperature of between 190–210° F. for approximately 20 minutes or until all of the water has been absorbed and the rice is fully hydrated and cooked.

This method is used for most types of rice, such as long-grained rice, medium- and short-grained 'sticky' rice, brown and basmati rice. Flavored rice is made by mixing flavorings such as turmeric or saffron into the water before the rice is added so that the rice will absorb the flavoring. Pilaf rice is also cooked in the same way by sauteeing onions, garlic and other herbs and spices, adding the water, bringing the water to a boil, and finally adding the rice to absorb the mixed ingredients.

A second method of cooking rice is termed the "excess water" method. In this method, the rice is added to a volume of water in excess of the amount the rice will absorb. At the end of the cooking process, when. the rice is fully cooked and hydrated, there will be some free water. The excess water method cannot be used in cooking Asian style 'sticky' rice because the excess water washes the starch from the surface of the kernels and leaves the rice less sticky. This method also cannot be used for cooking flavored rice or pilaf rice because the excess water dilutes the flavorings. Flavorings for rice are generally very expensive and it is desirable not to waste them by washing them away with the excess water.

The full absorption method of rice cooking is always used in batch cooking of rice. This method works reasonably well when the batch size is small (1–5 lbs. per batch). However, it does not work well when the batch size is several hundred pounds. This is because cooked rice on the surface of the batch has a lower water content than the rice on the bottom of the batch, rendering the batch of uneven quality. The unevenness occurs because as the rice kernels absorb water the kernels swell and the batch rises slightly out of the water pool. Once the top layer of rice has emerged from the water it cannot absorb additional water; at the same time rice kernels at lower levels in the batch with excess water around them continue to absorb additional water. When using this method, where the rice batch is 8–24 inches deep, the top layers have a much lower water content than the rice in the lower layers. In fact, rice at the bottom of the batch is over hydrated, soft and spongy; rice in the middle layers is generally hydrated properly, and rice near the top is under hydrated.

Continuous cooking of all cereal grain and cereal products, including rice, is much more efficient than cooking in batches. However, up to the present time true continuous cooking of rice could only be accomplished using the excess water method, and even then it was only used in cooking simple long grained white rice.

In Asia a semi-continuous full absorption cooking method is employed. The Asian medium- or short-grained types of rice are pre-soaked in water for one to two hours before cooking. Small pots are filled with a precise amount of water and pre-soaked rice, then conveyed through an oven to cook the rice in assembly line fashion. This system is very expensive and complicated to mechanize or to perform robotically for the following reasons: each pot must be filled with exactly the right amount of water and rice; the cover must be mechanically placed on the top of the cooking vessel; the pot is then conveyed through the oven; the cover is removed and the cooked rice tipped out; and the pot must then be washed and conveyed back to the beginning to receive another batch of rice and water. A machine to cook 2000 lbs. per hour of sticky rice presently costs in excess of $1,000,000 USD.

An additional disadvantage of this type of rice cooking system is that the rice is not stirred during the hydration time in the oven. As a result rice at the bottom of the pot has longer water contact time than rice at the top of the pot. Again, this results in uneven quality as the rice on the top layers have a lower water content than the rice kernels on the bottom layers. Accordingly, the result is much the same as that of the commercial batch cooking systems, with one difference: even the rice in the middle layers of the batch are generally not properly hydrated.

No other continuous full absorption method of cooking rice has been devised other than the assembly line pot method. Evidently no one has been able to conceive of a way to control the water and keep it in contact with each kernel until all rice kernels absorb the proper amount of water.

DISCLOSURE OF INVENTION

Generally: The present invention relates to a method of cooking cereal grains and products made of cereal grains in a batch cooker or continuously in a continuous cooker with controlled hydration. Also disclosed is an apparatus for the batch cooking of cereal grains and for the continuous cooking of cereal grains using the full absorption cooking method. Using the method and apparatus disclosed herein, a large bed of uncooked particulate cereal product is heated by direct steam injection without being in the presence of liquid water until the product is thoroughly heated to a temperature of approximately 190–200° F. Hot water, approximately 200° F. is then metered and periodically sprayed onto the top layers of the cereal at a rate slightly higher than the absorption rate of the food product, thereby allowing the water to percolate down through the cereal to the bottom layers at a rate matching the rate at which the product absorbs it during its vertical migration. The cereal in its fully heated condition begins to absorb the water that coats the surface of the cereal kernels. By periodically metering and spraying more water onto the cereal grain layers at a rate slightly above the rate at which the hydrating kernels absorb the water, the kernels throughout the volume of product will hydrate at an optimal rate.

In a continuous cooker this process is employed while the cereal is conveyed horizontally from an inlet end of the cooker toward the discharge or outlet end. At the discharge end of the cooker the cereal grains are fully hydrated and have absorbed all of the cook water sprayed onto the kernels during its transit through the cooking apparatus.

Although this invention applies to any cereal grain (such as rice, wheat, oats, corn, etc.) or any product made from cereal grain (such as pasta, oat meal, risotto, etc.) the instant application refers to rice for purposes of illustration and example only.

The full absorption batch or continuous rice cooking process and apparatus of the present invention will produce high quality rice at a fraction of the cost of existing batch or continuous assembly line pot cooking systems. It can cook Asian short grained 'sticky' rice, flavored rice and pilaf rice. The cooking process is controlled precisely to result in the same quality as batch cooked rice.

Summary of the Inventive Method: Each type of rice has a sequence of stages in the full absorption cooking process: First, either immediately preceding or as product is loaded into the cooking vessel, the rice kernels are washed for approximately four minutes to remove dust and surface starch. This is an optional but preferable stage; i.e., the rice need not be washed before cooking. The washing is accomplished by spraying water onto the rice at a high rate through at least one nozzle and while the rice is still at a relatively low temperature. The rice does not absorb water during this stage. After washing, the rice is exposed to steam in a heating stage for approximately three minutes. This brings the temperature of the rice up to substantially the temperature of the hot water that will be sprayed onto the rice throughout the cooking stages, thus equilibrating the rice. During this 'heating' stage the kernels remain hard, relatively impermeable, and absorb. very little water. For the next approximately thirteen minutes (13 to 18 minutes into the cook) most of the water that will be absorbed in cooking is sucked into the kernels as the water is sprayed onto the rice through a plurality of hot water nozzles during a 'steam and hydration' stage. Then, for the next approximately five to seven minutes (18–25 minutes into the cook) the water absorption of the rice dramatically slows down and the rice begins to swell in the final cooking stage, i.e., the final steaming stage, which is accomplished by the extremely steamy air maintained in the cooking vessel generally. but especially in the region proximate the discharge end of the cooker. This final stage gives each kernel a plump firm texture. After cooking, the rice is conveyed through a discharge outlet and into discharge bin.

The surface tension of a small amount of water coating each rice kernel will hold the water in place without runoff. If additional water is sprayed onto the rice, the surface tension of the water will be overcome and the excess water will gravitate to a lower level. In contrast to all existing art, both the continuous and batch cooking methods of the present invention involve spraying hot water onto the surface of the rice at a controlled, metered rate so that the surface tension of the water keeps the cook water in contact with each kernel as the rice absorbs the water. By controlling the rate at which the water is sprayed on or pulsing the water spray on and off, the water seeps down through the layers of rice from top to bottom at the same rate as the water is absorbed by the rice kernels at all levels and layers. Furthermore, in the continuous cooking method, the rice is periodically moved longitudinally through the cooking vessel while simultaneously being mixed to ensure extremely homogeneous exposure time to cook water.

Summary of the Inventive Apparatus for Continuous Cooking: The present invention may be embodied as a continuous grain cooking apparatus or a batch grain cooking apparatus. The continuous cooking apparatus comprises a substantially horizontal vessel in which the hydration and cooking process takes place. The vessel may have either a single trough or twin, side-by-side troughs. In a vessel with a single trough is a motorized screw conveyor with a single auger; in a vessel with twin trough the screw conveyor comprises parallel, side by side intermeshing augers. For long grained rice or cereals that do not stick together, a single auger system is adequate. For sticky rice or sticky cereal products, such as risotto or hominy grits, the product will stick to the rotating screw and will not convey properly. Accordingly, a double auger system is more suitable for continuous cooking of such products.

The auger flights on the double auger system are wound such that by rotating the augers in a counter rotating direction, up in the center, the rice is pushed to center of the cooker conveyor as the rice is conveyed from the inlet toward the outlet.( The mound of rice conveyed through the vessel is referred to herein as a rice bed or a bed of rice.) When the augers' direction of rotation is reversed the rice is pushed outwardly toward the sides of the vessel and away from the center or interior. By changing the direction of rotation on a preprogrammed interval, the rice bed will be spread out and then pushed together in the center repeatedly as the bed is conveyed toward the discharge end. This movement and agitation exposes a high percentage of the rice kernels to the water spray from above and continuously stirs the rice to promote even hydration.

Down the length of the auger the 360 degree auger flights may be intermittently separated by sections of shaft without flights and on which mixing bars, or spokes, are welded and radially disposed. The action of the counter rotating augers, which rotate upwardly in the center, has the effect of keeping sticky rice from sticking to the auger flights while the bars mix the hydrating rice. The auger flights on the opposing auger clean the product from the flights on the adjacent auger. The spokes may also be equipped with paddles affixed to their distal end to assist in mixing and moving rice, as well as cleaning product from surfaces within the spoke's range of movement.

Along the bottom of the twin auger trough is a row of direct steam injectors. These injectors are oriented to inject steam into the moving rice as it is conveyed along. The continuous gentle stirring of the rice by the counter rotating augers keeps the water spray and steam evenly mixed with the hydrating rice.

The rice is metered into the inlet of the cooker either manually or, preferably, by an electronic weigh belt feeder or gravimetric screw feeder. As the raw, dry rice is metered into the cooker it may be washed with a heavy water spray using either cold or hot water and the excess water then drained out through a screen in the bottom of the cooker tub. Alternatively, washing may be accomplished outside the cooker, drained, and then conveyed onto the feeder using any of a number of suitable conveying devices, preferably an elevator conveyor. The washing removes dust and surface starch that collects on the kernels during the milling process. Wash water representing approximately ten percent (10%) of the weight of the dry rice will be held around the dry rice kernels due to water surface tension. If hot water is used in the wash, the heat from the hot wash water (200° F.) increases the temperature of the rice as it is being washed.

The control of the rice feeder is electronically networked with the control of the cook water metering system and the agitation system through a programmable logic controller (PLC). This control system may be programmed to spray extremely precise amounts of hot water at any point in the length of the cooking vessel, and during any stage of the agitation cycle, to keep each kernel surrounded with a preferred amount of water as it hydrates. The control assures that an excess of water will not be sprayed onto the rice bed. Using prior methods, an excess of water is often sprayed onto the bed of rice during the cooking process, and the water tends to collect near the bottom layers of the bed. Using the present inventive apparatus and method, if water is sprayed on at too high a rate in one area, the paddles on the slowly rotating auger flights redistribute the excess water to less hydrated rice kernels.

The water spray rate is governed by the feed rate of the rice being fed into the cooker. The ratio of water to rice and the percentage of water flow at each point in the length of the cooker are controlled by a PLC. These variables can be independently programmed for any product being cooked (cereal grain or product made with a cereal grain).

To get good water spray coverage on the fill surface of the layers of rice being conveyed, the water metering system cycles on and off under precise control by the PLC program, which coordinates the rice gravimetric or weigh belt feeder. the auger motor, and the water flow control valve. The water flow is controlled with a sufficient flow rate to provide adequate spray coverage and is turned off automatically at each spray nozzle location when the proper metered amount of water has been sprayed on to match the hydration of the entire bed of rice. The pulsing of the water on and off controls the distribution of water from the inlet end of the vessel to the discharge end.

Flavorings and spices can be mixed with the cook water and sprayed onto the hydrating rice. Even cooked diced onions, garlic or tomato can be metered into the rice since the intermeshing augers will gently mix in these ingredients. Because there is no excess water to carry the ingredients away or to compromise the even distribution of these ingredients, the resulting finished rice dish is homogeneous throughout the production cycle. Large particulate products such as bay leaves can be added to the rice on a continuous basis and they will be mixed in thoroughly and evenly.

It is important that the rice be kept at or near 210° F. during the full length of the hydration cycle, and it is also important that the environment above the rice be maintained steamy and moist throughout the full length of the cooker. To ensure the maintenance of this environment, the cover is sealed with a water seal or gasket system and the direct steam diffusers are positioned the full length of the cooker. Steam that is not condensed by the hydrating rice is contained above the rice and is locked in by the water sealed cover. The only place steam can escape is through small openings at the inlet and outlet of the cooker. The cook water sprayed onto the hydrating rice is continuously preheated to 195–200° F. as it passes through a water heater either mounted on the cooker or located separately.

Summary of the Inventive Apparatus for Batch Cooking: The controlled hydration method and apparatus may also be adapted for use in a batch cooking process wherein the food product is not conveyed or moved in the cooking vessel or relative to the hydration source. As embodied in a commercial batch rice cooker, the batch cooking apparatus of the present invention provides means for water to be sprayed onto stationary rice in a batch cooking vessel at the same time steam injectors are injecting steam in the region immediately underneath the rice batch. The steam rising up through the batch heats the rice while the water seeping down from the top layers provides the moisture for proper hydration. Gravity distributes the cook water evenly from top to bottom hydrating every rice kernel properly.

This controlled hydration method of full absorption cooking can be used for cooking grains and cereals other than rice, including wheat, barley, oats, pasta and other food products with a cereal composition.

BRIEF DESCRIPTION OF THE DRAWINGS

FIG. 1 is a side elevation cross-sectional view of a first preferred embodiment of the apparatus for continuous controlled hydration cooking of the present invention;

FIG. 2 is an end elevation view of the apparatus of FIG. 1;

FIG. 3 is a top view of the parallel, side-by-side twin intermeshing augers of the first preferred embodiment, particularly illustrating the intermittent screw flights and the radially extending spokes with paddles;

FIG. 4 is a cross-sectional end view of the cooking vessel showing the relative position of the mixing rods of the augers and the regions in which steam and hot water are introduced into the vessel;

FIG. 5 is a side elevation view of the present invention, showing alternative means for loading the cooking vessel and alternative means for discharging rice after cooking;

FIG. 6 is a top elevation view of the rice cooker of FIG. 5;

FIG. 7 is a top view of the cooking vessel of the inventive apparatus, shown with its top cover removed and particularly illustrating a second preferred embodiment of the augers, in this instance having continuous screw flights and no radially extending spokes;

FIG. 8 is side elevation cross-sectional view of the batch cooking apparatus of the present invention, also showing an alternative grain feeding assembly and illustrating the regions in which steam and water are introduced into the cooking vessel; and FIG. 9 is a side elevation cross-sectional view showing the cooking cycle and the areas of the vessel in which each stage of the cycle takes place.

BEST MODE FOR CARRYING OUT THE INVENTION

Apparatus: The present invention comprises a method and an apparatus for controlled hydration and continuous full absorption cooking of a bed of particulate food product. FIG. 1 is a side elevation cross-sectional view of a first preferred embodiment of the inventive apparatus. FIG. 2 is an end elevation view of the apparatus of FIG. 1, as seen from the outlet end. These views show that the inventive apparatus, generally denominated 10 herein, comprises a substantially horizontal vessel 12 in which the hydration and cooking process takes place. The vessel 12 has an inlet end 14 and an inlet port 16 for introducing food product into the cooking vessel, an outlet end 18 and an outlet port 20 for the discharge of the food product, an upper portion 22, and at least one trough portion 24. In general terms, the vessel is further equipped with means for loading food product into said vessel, means for moving the food product from the inlet end to the outlet end of said vessel during said hydration and cooking process, and a system for hydrating and cooking the food product during the transit by the conveying means from the inlet end to the outlet end of the cooking vessel. The hydration system (detailed below)

delivers water to the surfaces of the food product so that the food product is exposed to water at substantially its rate of absorption during the hydration and cooking process. The apparatus includes means for discharging the food product from said vessel.

The cooking vessel of the inventive apparatus has a water tight top cover 26 pivotally connected with one or more hinges 28 to the vessel and running substantially the entire length of the vessel along its upper portion 22 so as to provide a water tight seal while in operation. The conveying means preferably comprises at least one screw auger 30, driven by at least one motor 32. Preferably the product loading system comprises a gravimetric product feeder 34 having an outlet positioned above a funnel assembly 36 for introducing food product into the inlet port 16. The loading system further comprises a hopper 38 for batch containment and gravity fed delivery of food product onto a motor driven conveyor belt 39 of the gravimetric product feeder. Alternatively, in applications where production rates are low and economic considerations dictate, the loading system elements can be eliminated and loading of the food product can be accomplished manually.

The vessel 12 includes a vessel carriage 40 for the support, transport, and positioning of the vessel on the production floor. The feeder 34 and hopper 38 are also positioned on a carriage 42, which may be part of, or separate and distinct from, vessel carriage 40.

A discharge bin 44, preferably portable and having a plurality of wheels 46 for easy movement, is provided and positioned underneath discharge outlet 20 when in operation.

The hydration system of the present invention is a combination steam and water injection system comprising at least one steam injector 47, and when more than one steam injector is included, the injectors are preferably positioned in a row underneath the moving bed of food product contained in the vessel during its operation. The steam injectors have nozzles oriented so as to direct steam into the bed of food product as it is conveyed along the length of the trough portion of the vessel from the inlet end to the outlet end.

The hydration system further comprises at least one water mister 48, and when there are more than one misters they are preferably positioned in a row in the upper portion of the vessel. The misters have nozzles positioned so as to direct a fine spray of water onto the bed of food product as it is conveyed along.

The hydration system also includes a programmable logic controller 50 for metering out the precise amount of water sprayed onto food product and for coordinating the water spray rate with the rate at which product is introduced into the cooking vessel, the agitation cycles, and the rate at which the product is conveyed through the cooking vessel. Ideally, the system may be programmed to spray water onto the food product at a rate that will match the absorption rate of the food product, or to slightly exceed the absorption rate, thereby assuring that an excess of water will not be sprayed onto the product so as to cause water to saturate the product and collect on the bottom of the trough portion of the vessel. To accomplish this result, the spray may be timed to take place in pulses at preprogrammed intervals. The length of the pulses and the rate of water mist introduced may be so finely tuned that the rate water is introduced into the vessel will slightly exceed the absorption rate of the product at any given stage of the cooking process, not only ensuring that excess water does not collect on the bottom of the vessel, but further ensuring that just the right amount of water percolates down through the bed of food product to hydrate the product evenly. This minimizes the cooking time and maximizes the quality of the cooked product.

In the event that product is manually loaded into the cooker, the PLC can be programmed to emit an audible sound from a speaker 51a or a visible signal from a light 51b at specific intervals to prompt an operator to load premeasured amounts of rice into the vessel. While not providing the convenience of a mechanized feeder, product quality is not affected in any way using a manual rice loading system.

Hot water, preferably within a range of about 190° F. to 210° F., and most preferably 200° F., is delivered to the spray misters from a water feeder 52 having a hot water metering pump 53, positioned on the carriage underneath the cooking vessel or standing separately from the vessel and its carriage, and operatively connected to the misters via one or more pipes 54 and hot water manifold 55. Steam is delivered to the steam injectors from an outside source preferably via two steam inlets 56 and steam manifolds, preferably including two steam manifolds 58a and 58b in the inlet section of the vessel, and two steam manifolds 59a and 59b in the cooking and discharge sections of the vessel, respectively.

FIG. 2 is an end elevation view of the apparatus of FIG. 1. This view shows that the vessel of the first preferred embodiment has twin trough portions 60 and 62.

FIG. 3 is a top view of the first preferred embodiment of the present invention, showing parallel, side-by-side twin intermeshing augers, 64 and 66, and particularly illustrating the intermittent screw flights and the radially extending spokes with paddles. The side-by-side augers are positioned in the twin troughs shown in FIG. 2. Augers 64 and 66 each have a horizontal shaft, 68 and 70, respectively, running the entire length of the vessel and a journal 71 at each end. Each auger further has screw flights 72 positioned so as to convey food product longitudinally along the entire length of said vessel from the inlet end to the outlet end and to mix the food product simultaneously. In the first preferred embodiment, as depicted in FIG. 3, the augers have a plurality of intermittent screw flights and a plurality of mixing rods, or spokes, 74 interposed between the intermittent screw flights which mix food product during cooking, distributing and excess water through the product bed, and scrape sticky food product from the surfaces of the screw flights and the interior walls of the cooking vessel. The spokes are preferably configured in two rows along the length of the horizontal shaft and situated 180 degrees apart from one another around the shaft. Each of the spokes 74 is connected to its respective horizontal shaft at its proximal end 76 so that it extends radially from the shaft at a substantially right angle relative to the longitudinal axis of the shaft. Each of the spokes preferably includes a paddle member 78 affixed to the distal end 80 of the spoke. The paddles of each row of spokes are preferably angled in parallel at substantially 45 degree angles relative to the longitudinal axis of the shaft.

FIG. 3 also shows that the side-by-side augers are operatively connected to an auger drive or motor 82, and then to one another inlet end by a gear assembly 84. FIG. 4 is a cross-sectional end view of the cooking vessel showing the relative position of the mixing rods of the augers of FIG. 3. This view shows that the rows of spokes of the side-by-side augers are positioned 90 degrees relative to one another. FIGS. 3 and 4 collectively show that the screw flights of auger 66 have a left hand pitch with each flight located 180 degrees relative to adjoining flight, and the screw flights of auger 64 have a right hand pitch with each flight located 180 degrees relative to the adjoining flight. These views also show that the augers turn in opposite directions regardless of the direction the motor is turning. Specifically, when the motor turns in direction A, auger 64 will rotate clockwise while auger 66 will rotate counterclockwise. When the motor is reversed, the rotation of each of the augers also reverses to move in direction B.

This configuration of auger shafts, flights, spokes, and paddles, and the gearing assembly that provides for opposing rotational motion of each auger shaft, provides a means to selectively move an entire bed of food product backwards and forwards along the length of the vessel, while simultaneously moving the particulate constituents of the bed vertically, up and down throughout the layers of the bed in the regions of hydration and cooking. The screw flights and paddles closely intermesh so that food product is thoroughly mixed, excess water is evenly distributed, and food product is kept from sticking to the operative surfaces of the augers. As noted, the PLC can be programmed to reverse motor directions so that the product alternately moves both toward and away from the outlet end for increased control over hydration and cooking of the food product.

FIG. 4 also shows the steam and water environment created by the hydration system and its relationship to the bed of food product, FP, conveyed though the cooking vessel during the cooking process. As may be readily appreciated, steam manifold 90 delivers steam that is widely broadcast upwardly and into the underside of the bed of food product through injectors 92. Hot water delivered from hot water source 94 is delivered in a highly controlled fashion through metering system 96 and then sprayed downwardly and broadcast widely onto the upper layer of food product through hot water nozzles 98.

FIG. 5 is a side elevation, partial cross-sectional view, and FIG. 6 is a top elevation view, of the present invention showing alternative means for loading product into the cooking vessel and unloading cooked product after discharge from the vessel. In this configuration, rice may be loaded into a free-standing, portable gravimetric feeder 100, which meters rice out onto an elevating rice conveyor 102. The rice is transported upwardly and dispensed onto a rice washing conveyor 104 having a perforated conveyor belt 106. A water source 108 sends a stream of wash water through a plurality of nozzles 110 positioned immediately above the moving stream of rice, and the rice is thus washed before loading into the cooking vessel. Dirty wash water drains through the perforated conveyor belt.

After washing, rice is loaded directly into the cooking vessel 112 (shown here in cross section) through inlet port 114 without passing through a funnel assembly. The prewashed rice is then hydrated and cooked exactly in the manner set forth above. However, at the end of its cooking cycle, the food product is discharged directly onto a discharge conveyor 116, which branches outwardly and away from the cooking vessel so that product is spread out for rapid cooling.

FIG. 7 is a top view of the cooking vessel of the inventive apparatus, shown with its top cover removed and particularly illustrating a second preferred embodiment of the intermeshing augers, 120 and 122, in this instance having continuous screw flights 124 and no radially extending spokes.

The above-described apparatus may also function as a batch cooker for batch hydration and full absorption cooking of a batch of particulate food product. To adapt the inventive apparatus to this purpose, it need be modified in no way other than to distribute the hot water nozzles evenly along the length of the upper portion of the cooking vessel.

FIG. 8 is side elevation cross-sectional view of the inventive apparatus adapted for use as a batch cooker 130, also showing an alternative loading assembly and illustrating the regions over which steam and water are introduced into the cooking vessel. In this figure, the product feeder is shown as an electronic weigh belt feeder 132 that delivers food product directly into the cooking vessel via cooker inlet 134.

In the non-continuous cooking process, a batch of rice is loaded into the vessel and formed into a relatively homogeneous, elongate rice bed by the mixing action of the augers. It is then maintained in a substantially stationary position with no mixing while steam injectors 136 inject steam and water source 137 delivers hot water to hot water metering pump 138, which routes the hot water through water misters 139 to hydrate the food product in a highly programmed, controlled fashion using PLC 135. For batch cooking, the steam injectors and water misters are spaced substantially evenly the entire length of the cooking vessel to ensure that no one part of the product bed will receive more hydration than any other part.

The general principles applicable to the continuous cooking method as accomplished by the above-described continuous cooking apparatus apply equally to the batch cooking process. Accordingly, water is delivered onto the upper layers of the batch of food product at a rate slightly above the absorption rate of the food product at the upper layer. Consequently, a small amount of excess water percolates down into the lower layers of the batch at a rate that closely matches the absorption rate of the food product. Throughout the process, a steamy internal atmosphere is maintained by the steam injector system, which ensures that the food product is kept at a temperature optimal for absorption. Thus, the rate of water delivery is tailored to match the food product batch in its entirety, and this close match economizes on cooking time and costs.

Method: It is evident from the description of the foregoing devices that the instant invention also includes a novel method of controlled hydration for either batch or continuous full absorption cooking of a bed of particulate food product. The fundamental steps in the method for continuous cooking comprise providing the above-described apparatus for continuous cooking of food product; loading the food product into the vessel through the inlet port to create a bed of food product; conveying the bed of food product from the inlet end to the outlet end of the vessel during the hydration and cooking process; hydrating the bed of food product during the conveyance from the inlet end to the outlet end of the vessel; delivering water to the surfaces of the food product during said hydration step so that the food product is exposed to water at substantially its rate of absorption during the hydration and cooking process; and discharging the food product from the vessel through the outlet port when the hydration and cooking process is completed. The step of conveying the bed of food product involves simultaneously mixing and conveying the bed of food product longitudinally along the entire length of the vessel from the inlet end to the outlet end. Further, the conveying step includes alternately moving product both toward and away from the outlet end of the vessel for increased control over hydration and cooking of the food product.

The food product loading step comprises providing a gravimetric product feeder operatively connected to the vessel at the inlet port for introducing food product into the inlet port of the vessel, and further comprises providing a hopper for batch containment and gravity fed delivery of food product to the product feeder. Alternatively, the food product loading step comprises providing an electronic weigh belt product feeder operatively connected to the vessel at the inlet port and further providing a hopper for batch containment and gravity fed delivery of food product to the electronic weigh belt feeder. Yet another alternative comprises manual loading of food product. This alternative is preferable for low production rates and for the most economical use.

For the tightest control of the product hydration and cooking, the hydration step preferably comprises two primary, but discrete phases: the first phase comprising directing steam to the underside of the bed of food product through steam injectors in order to heat the food product to a temperature at which its absorption rate is optimum; and a second phase comprising directing a fine spray of water onto the upper surface of the bed of food product through the water misters. The second phase of the hydration step also preferably includes continuing to direct steam to the underside of the bed of food product to maintain optimum humidity in the cooking vessel while simultaneously directing a fine spray of water onto the upper surface of the bed of food product.

The entire hydration step includes controlling the rate at which water is sprayed onto the food product so that water is sprayed a rate substantially equal to the absorption rate of the entire bed or batch of food product, but, again, at a rate slightly above the absorption rate of the product in the upper layers of the bed. The best results are obtained by spraying water onto the food product in timed pulses.

The hydration step should also include imposing a tight control over the water spray rate and the ratio of water to food product by delivering water according to the rate at which the food product is introduced into the vessel. Control over the hydration and cooking process is mechanized by providing a programmable logic circuit electrically and operatively connected to the steam injector, water mister, product feeder, and auger motor, and programming the programmable logic circuit to control food product delivery into the cooking vessel, water delivery to the food product during the hydration step, and agitation and product movement in the manner described. If a manual system of adding rice to the cooker is used, control over the hydration step excludes control over the product feeder.

The method of controlled hydration batch cooking of the present invention generally comprises the same steps as those pertaining to the continuous cooking method. However, product is not continually moved through the cooking vessel during the cooking stage. Instead, product is loaded into the vessel—either washed beforehand, washed when loaded, or not washed at all—and then it is moved by the screw augers to form a substantially homogeneous bed of product along the length of the cooking vessel. The remaining steps include: heating the product by the introduction of steam to the underside of the product bed through steam injectors; spraying hot water onto the upper layers of the food product bed while continuing to inject steam into the cooking vessel, the rate of water spray being tightly controlled to match the absorption rate of the food product. After the cooking is completed, the product may be moved by the screw augers to the discharge end of the cooking vessel and through the discharge outlet.

FIG. 9 shows the stages of the continuous cooking method for controlled hydration grain cooking of rice. (It should be noted that the cooking process for rice is described herein for illustrative purposes only and that the times for each stage of the cooking process may be readily adapted for any kind of particulate cereal food product.) As shown in the vessel of this embodiment, product is loaded into the cooking vessel and the rice kernels are washed in the washing stage 140 for approximately four minutes. As noted previously, the washing step and washing apparatus are optional. Moreover, the washing step may be accomplished outside the cooking vessel, as depicted in FIGS. 5 and 6. The washing is accomplished by spraying water onto the rice at a high rate through at least one nozzle 142. After washing, the rice is exposed to steam only in a heating stage 144 which takes place inside the cooking vessel and endures for approximately three minutes. This step equilibrates the rice to the temperature of the hot water that will be sprayed onto the rice throughout the cooking stages. During this 'heating', or equilibration stage the kernels remain hard, relatively impermeable, and absorb very little water. For the next approximately thirteen minutes (13 to 18 minutes into the cook) almost all of the water that will ultimately be absorbed by the rice is sucked into the kernels as it is sprayed onto the rice through hot water nozzles 146. This is the 'steam and hydration' stage 148. Thereafter, for the next approximately five to seven minutes (18–25 minutes into the cook) the water absorption of the rice dramatically slows down and the rice begins to swell in the steamy atmosphere maintained in the final steaming stage 150, giving each kernel a plump firm texture. After cooking, the rice is pushed by the screw augers 152 through discharge outlet 154 and either into discharge bin 156 or onto a discharge rice conveyor, as shown in FIGS. 5 and 6.

What is claimed as invention is:

1. An apparatus for controlled hydration and continuous full absorption cooking of a bed of particulate food product, said apparatus comprising:

a substantially horizontal vessel in which said hydration and cooking process takes place, having an inlet end and an inlet port for introducing food product into said vessel, an outlet end and an outlet port for the discharge of the food product, an upper portion, and at least one trough portion;

conveying means for moving food product from said inlet end to said outlet end of said vessel during said hydration and cooking process;

hydration means for hydrating and cooking the food product during the transit by said conveying means from said inlet end to said outlet end of said vessel, said hydration means delivering water to the surfaces of the food product so that the food product is exposed to water at substantially its rate of absorption during the hydration and cooking process; and outlet means for discharging the food product from said vessel.

2. The apparatus of claim 1 wherein said vessel has a water tight top cover connected to said vessel and running substantially the entire length of said vessel along its upper portion so as to provide a water tight seal while in operation.

3. The apparatus of claim 2 wherein said water tight top cover is pivotally connected to said vessel.

4. The apparatus of claim 1 wherein said conveying means comprises a motor driven screw conveyor having at least one auger, said at least one auger having a horizontal shaft running substantially the entire length of said vessel and screw flights positioned so as to convey food product longitudinally along the entire length of said vessel from said inlet end to said outlet end and to mix the food product simultaneously.

5. The apparatus of claim 4 wherein said at least one auger has continuous screw flights.

6. The apparatus of claim 4 wherein said at least one auger has a plurality of intermittent screw flights and a plurality of spokes interposed between said intermittent screw flights for mixing food product during cooking.

7. The apparatus of claim 6 wherein said each of said plurality of spokes has a proximal end and a distal end, said proximal end connected to said horizontal auger shaft, said spoke extending radially from said horizontal shaft and including a paddle connected at its distal end.

8. The apparatus of claim 1 wherein said conveying means alternately moves product both toward and away from said outlet end for increased control over hydration and cooking of said product.

9. The apparatus of claim 1 wherein said vessel has side-by-side twin trough portions.

10. The apparatus of claim 9 wherein said conveying means comprises twin side-by-side motorized screw augers having parallel horizontal shafts and continuous screw flights.

11. The apparatus of claim 10 wherein said twin side-by-side screw augers are intermeshing.

12. The apparatus of claim 9 wherein said conveying means comprises twin side-by-side screw augers having parallel horizontal shafts, a plurality of intermittent screw flights, and a plurality of spokes interposed between said intermittent screw flights.

13. The apparatus of claim 12 wherein said twin side-by-side screw augers are intermeshing.

14. The apparatus of claim 9 wherein said conveying means comprises twin side-by-side screw augers having parallel horizontal shafts, a plurality of intermittent screw flights, a plurality of spokes with a proximal end and a distal end, said proximal end connected to said horizontal auger shaft, each of said spokes extending radially from said horizontal shaft and including a paddle connected at its distal end.

15. The apparatus of claim 14 wherein said side-by-side screw augers are intermeshing.

16. The apparatus of claim 1 further including a carriage for the support, transport, and positioning of said vessel.

17. The apparatus of claim 1 further including loading means.

18. The apparatus of claim 17 wherein said loading means further includes means for precisely metering the introduction of food product into said vessel.

19. The apparatus of claim 17 wherein said loading means comprises:
   a product feeder operatively connected to said vessel at said inlet port for introducing food product into said inlet port of said vessel; and
   a hopper for batch containment and gravity fed delivery of food product to said product feeder.

20. The apparatus of claim 19 wherein said product feeder is a gravimetric feeder.

21. The apparatus of claim 19 wherein said product feeder is an electronic weigh belt feeder.

22. The apparatus of claim 1 wherein said hydration means is a combination steam and water injection system comprising at least one row of steam injectors positioned underneath the bed of food product contained in said vessel during operation and having nozzles oriented so as to direct steam into the bed of food product as it is conveyed along, and at least one row of water misters positioned in said upper portion of said vessel and having nozzles positioned so as to direct a fine spray of water onto food product as it is conveyed along.

23. The apparatus of claim 22 wherein said hydration means further includes control means for metering out the precise amount of water sprayed onto food product to match the absorption rate of the food product, assuring that an excess of water will not be sprayed onto the product so as to cause water to saturate the product and collect on the bottom of said at least one trough portion of said vessel, and assuring that sufficient water is sprayed onto the food product to minimize hydration and cooking time.

24. The apparatus of claim 23 further including spray control means for controlling the water spray rate according to the feed rate of food product introduced into said machine and the ratio of water to food product.

25. The apparatus of claim 23 wherein said spray control means comprises a programmable logic circuit operatively connected to said hydration means.

26. The apparatus of claim 25 wherein said programmable logic circuit is operatively connected to said motorized screw augers and is programmable to coordinate product movement and agitation in said vessel with the water spray rate and product loading rate.

27. The apparatus of claim 22 wherein water is sprayed onto food product in timed pulses so as to control flow rate and distribution.

* * * * *